United States Patent [19]

Ansel

[11] Patent Number: 4,590,250
[45] Date of Patent: May 20, 1986

[54] POLYURETHANE COATINGS FOR MAGNETIC RECORDING STRUCTURES AND PRODUCTION THEREOF

[75] Inventor: Robert E. Ansel, Hoffman Estates, Ill.

[73] Assignee: DeSoto, Inc., Des Plaines, Ill.

[21] Appl. No.: 754,409

[22] Filed: Jul. 12, 1985

Related U.S. Application Data

[63] Continuation-in-part of Ser. No. 571,190, Jan. 16, 1984, abandoned.

[51] Int. Cl.$^4$ ............... C08F 26/02; C08F 126/02; C08F 226/02
[52] U.S. Cl. ................... 526/301; 430/284; 430/296; 528/85; 558/266
[58] Field of Search ............... 526/301; 528/85; 430/284

[56] References Cited

U.S. PATENT DOCUMENTS

| | | | |
|---|---|---|---|
| 4,250,248 | 2/1981 | Faust | 430/284 |
| 4,250,322 | 2/1981 | Effimov et al. | 260/463 |
| 4,264,752 | 4/1981 | Watson, Jr. | 528/75 |
| 4,267,120 | 5/1981 | Euscurida et al. | 260/463 |
| 4,357,414 | 11/1982 | Hartmann et al. | 430/284 |
| 4,423,179 | 12/1983 | Suargliardo | 528/85 |
| 4,456,745 | 6/1984 | Rajan | 528/95 |
| 4,463,141 | 7/1984 | Robinson | 260/463 |

*Primary Examiner*—Joseph L. Schofer
*Assistant Examiner*—Peter F. Kulkosky

*Attorney, Agent, or Firm*—Dressler, Goldsmith, Shore, Sutker & Milnamow, Ltd.

[57] ABSTRACT

Radiation curable coating compositions, and especially electron beam-curable coating compositions, are disclosed in which magnetizable particles are dispersed in a liquid vehicle comprising an hydroxy functional polyethylenically unsaturated polyurethane having the following structural formula:

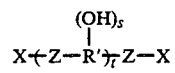

in which X is an ethylenically unsaturated monomer initially carrying a single hydroxy group, R' is the residue of an at least trifunctional polyol or amino alcohol linking compound, s is a number of 0.8 to 10, t is a number from 1 to 15, and Z is a diisocyanate terminated polycarbonate diol polyurethane oligomer having the following structure:

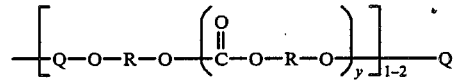

in which R is alkylene having from 1–20 carbon atoms, Q is the residue of an organic diisocyanate; y is at least 1, and R and y are selected to provide a molecular weight for the polycarbonate diol reactant of from 300 to 3000.

15 Claims, No Drawings

POLYURETHANE COATINGS FOR MAGNETIC RECORDING STRUCTURES AND PRODUCTION THEREOF

DESCRIPTION

This application is a continuation-in-part of my prior application Ser. No. 571,190 filed Jan. 16, 1984, and now abandoned.

FIELD OF INVENTION

This invention relates to coating compositions which are curable with radiation, and especially with electron beam radiation, to enable the rapid production of cured pigmented coatings, especially magnetic recording structures, such as tapes or disks, in which a layer of magnetizable particles is dispersed in a solidified thermoset coating vehicle on a nonmagnetizable substrate.

BACKGROUND ART

The production of magnetic recording structures, such as tapes and disks, is known. In these known processes, a liquid coating composition which has been pigmented with particles having the capacity to retain a magnetic orientation, referred to hereinafter as magnetizable particles, is applied to an appropriate nonmagnetizable substrate. The pigmented coating is then baked to solidify the coating and fix the magnetizable particles in place within the coating.

In the known processes, the magnetizable particles are used in admixture with a nonmagnetizable binder (which may be thermoplastic or thermosetting) and a volatile solvent is present to dissolve the binder and provide a solvent solution which is applied as a thin coating upon the substrate. The coated substrate is then force dried to remove the solvent. Some reactive binders are cured with polyisocyanates by prolonged storage in a hot room, e.g., at 140° F. An illustrative process is shown in U.S. Pat. No. 4,246,316.

Unfortunately, the known processes are slow, and the cure used may lack desired uniformity. Also, when isocyanate-functional materials are used, these have a limited pot life and are hard to work with. It is desired to employ electron beam radiation to rapidly cure a polyethylenically unsaturated coating liquid on the nonmagnetizable substrate, but the cured coatings produced in this fashion lack the physical toughness needed to provide a good product. In this connection, reference is made to Japanese Application No. 48-126778 which was laid open June 24, 1975 under No. 50-77433.

It should be appreciated that the electron beam curing process does provide many advantages, such as the use of stable coatings, greater speed of production, more uniform product quality, more compact equipment, and, per this invention, products of greater durability in which the magnetic pigment is more easily and uniformly distributed.

In my prior application Ser. No. 528,044 filed Aug. 31, 1983, I disclosed coating compositions which can be pigmented with magnetizable particles and applied and cured with electron beam radiation to provide magnetic recording media. However, it has been difficult to get good pigment wetting without extensive pretreatment of the pigment or by modifying the coating resin in a manner which unduly softens or degrades the system, and this limits the ease and uniformity of pigment dispersal. This invention is addressed to the problem of providing improved radiation curable coating compositions which are hard and tough and which also have good pigment wetting properties.

DISCLOSURE OF INVENTION

In accordance with this invention, radiation-curable coating compositions adapted to be cured by exposure to electron beam radiation comprise an hydroxy-functional polyethylenically unsaturated polyurethane having the formula set forth hereinafter and which can be produced by reacting a linear diisocyanate-terminated polyurethane polycarbonate oligomer, which will be discussed hereinafter, with a molar deficiency of an ethylenically unsaturated monomer having a single isocyanate-reactive hydrogen atom, especially 2-hydroxyethyl acrylate, to provide an oligomeric monoisocyanate which is end capped with an ethylenic group on one of its two ends. This end capped unsaturated monoisocyanate is preferably employed in admixture with unreacted diisocyanate. The ethylenic group is preferably an acrylate group, and acrylates will be referred to for convenience, even though these are less desirably replaced by other ethylenic groups, as hereinafter discussed.

This oligomeric ethylenic monoisocyanate, preferably in admixture with unreacted diisocyanate, is then reacted with enough at least trifunctional polyol or amino alcohol linking compound containing at least one hydroxyl group and sufficient hydroxy and/or amino hydrogen functionality to react with all of the isocyanate functionality present to form a polyethylenic polyurethane while leaving only unreacted hydroxy groups. It is preferred to leave at least one equivalent of hydroxy per mole of polyol or amino polyol used. The amine functionality cannot exceed the isocyanate functionality because it is necessary to consume all of the amino hydrogen atoms present. In this connection, it will be appreciated that amino hydrogen atoms are more rapidly reactive with isocyanate functionality than hydroxyl groups.

An hydroxy-functional polyethylenically unsaturated polyurethane is thus formed having the following structural formula:

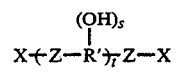

in which X is an ethylenically unsaturated monomer initially carrying a single hydroxy group, preferably an hydroxyalkyl acrylate like 2-hydroxyethyl acrylate Z is a diisocyanate terminated polycarbonate diol polyurethane oligomer which will be described hereinafter; R' is the residue of an at least trifunctional polyol or amino alcohol linking compound, preferably having a molecular weight of less than 600, such as glycerin; s is a number of 0.8 to 10, preferably 1 to 4; and t is a number from 1 to 15, preferably from 2–5.

These hydroxy-functional polyethylenically unsaturated polyurethanes are radiation curable, either alone or in combination with other monoethylenic or polyethylenic compounds, and they exhibit improved pigment wetting characteristics which helps to provide pigmented coating compositions which can be cured by electron beam radiation. In combination with these desirable properties, the intrinsic hardness of the polycarbonate diol polyurethane component offsets the softening tendency of the linking compound which provides the hydroxyl functionality needed for improved pigment wetting.

Coating compositions are preferably provided containing magnetizable particles dispersed in a liquid vehicle comprising the subject hydroxy-functional diacrylates. The liquid vehicle requires an appropriate viscosity for coating, so liquid components which may be monoethylenic, polyethylenic, or a volatile nonreactive solvent, are included. Typical unsaturated liquids are dimethyl acrylamide, and pentaerythritol triacrylate, though others will be noted hereinafter.

The volatile solvents which may be used are subject to wide variation. Thus, aromatic solvents, such as toluene, cycloaliphatic solvents, such as cyclohexanone, and heterocyclic solvents, such as tetrahydrofuran, are all useful herein and will be illustrated hereinafter.

Based on 100 parts of nonvolatile solids (which includes reactive volatile components) in the pigmented coating composition, it is preferred to employ from 50 to 400 parts of volatile solvent, preferably from 100 to 300 parts. These solvents are removed, preferably by vaporization, at room or slightly elevated temperature, prior to curing. Even when liquid ethylenic or polyethylenic components are present, it is desirable to have some volatile nonreactive solvent present as well so as to minimize the proportion of other liquids required to provide a liquid coating composition of coating viscosity.

This liquid coating composition is preferably pigmented with magnetizable particles and applied as a wet film on a nonmagnetizable substrate, such as polyethylene terephthalate film. If the coating composition contains a volatile nonreactive solvent, this solvent is vaporized away at room or slightly elevated temperature. The coating, wet or dry and at room or elevated temperature, is exposed to electron beam radiation to produce a solid thermoset coating having magnetizable particles dispersed therein.

The pigmentation of the coatings with magnetizable particles in accordance with this invention will provide dispersions having from 50% to 85% by weight of pigment particles based on the total weight of the cured coating. It is convenient to apply coating compositions having from 25% to 50% of total nonvolatile solids.

The linear hydroxy-functional polyurethane oligomers of this invention are terminated with unsaturated groups, preferably with acrylate groups. This is done by using 2-hydroxyethyl acrylate, or other ethylenic monomer having a single hydroxyl group, like 2-hydroxyethyl methacrylate, 2-hydroxypropyl acrylate, the corresponding itaconates, or allyl alcohol in an amount to react with about one-half or less of the isocyanate functionality available in the isocyanate-functional oligomer. Monohydric polyacrylates, such as pentaerythritol triacrylate, are also useful. Additional diisocyanate can be added after the reaction. The result is an oligomeric monoisocyanate having one acrylate or equivalent group at one end, and one isocyanate group on the other end, usually in admixture with unreacted diisocyanate.

The proportion of unreacted diisocyanate determines the number of repeating units in the polyurethane which is formed. It is preferred to have at least 0.5 up to about 15, preferably from 2 to 5, moles of unreacted diisocyanate present in admixture with the ethylenic monoisocyanate.

The ethylenic monoisocyanate, either alone or preferably in admixture with unreacted diisocyanate, is reacted with at least trifunctional polyol or amino alcohol linking compound, and that compound is subject to wide variation. Its function will be illustrated by the presently preferred linking compound, namely: glycerin. This is used in an amount sufficient to cause all the isocyanate functionality to be consumed by reaction with the primary hydroxy groups in the glycerin, thus leaving all the secondary hydroxy groups unreacted in the polyurethane which is formed. If one were to instead use trimethylol propane as the polyol, much the same result would be achieved, but now the product uniformity would not be as good. Using a linking compound which also contains amino hydrogen atoms, these react with the isocyanate functionality far more rapidly than even primary hydroxy groups, so the amino hydrogen atoms are consumed first. When amino hydrogen atoms are present in the linking compound, it is necessary that there be more isocyanate than amino hydrogen to insure that the amino hydrogen atoms are consumed and do not react with the unsaturation in the product by Michael adduction.

Other linking compounds which may be used are illustrated by trimethylol propane. Higher functional compounds may also be used, such as pentaerythritol and polyepoxides which have been reacted with a compound which consumes the epoxy groups and adds secondary hydroxyl groups. These may be carboxylic acids, like acetic acid, which provide hydroxy ester groups, or alcohols, like butanol, which provide hydroxy ether groups, or amines which provide amino alcohol groups.

Amino alcohols are also useful, such as monoethanol amine which can be used after reaction with 0.5 molar proportion of ethylene dichloride or ethylene glycol diacrylate. Diethanol amine is useful, the secondary amino hydrogen atom and one of the two hydroxy groups reacting with the isocyanate groups.

Also, a small proportion of a difunctional compound having only two groups reactive with isocyanate functionality, like butylene glycol, butylene dimercaptan, or butylene diamine, can also be present. This compound will couple two of the isocyanate groups together without providing hydroxy functionality, and hence reduces the final hydroxy functionality. Such a compound may be tolerated in an amount up to about 30 mol percent of total linking compound, but is desirably absent.

The coatings of this invention possess superior toughness enabling magnetic recording structures of good quality to be rapidly produced, and the pigment-wetting characteristics conferred by the unreacted hydroxyl groups on the polyol or polyol amine which links the polycarbonate polyurethane are beneficial and improve pigment wetting so as to ease the burden of grinding and the uniformity of distribution of the pigment in the coating composition as well as in the final cured coatings.

When the uncured coating is a solid film, as can be obtained herein by using a proportion of volatile organic solvent which is removed by volatilization before the deposited coating is cured, it can be calendered or otherwise mechanically worked prior to electron beam curing exposure.

It is essential in accordance with this invention to use as Z in the formula previously presented, a diisocyanate terminated polycarbonate diol polyurethane oligomer, these having the formula:

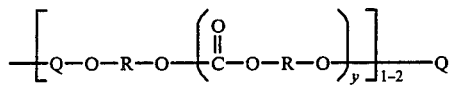

in which R is alkylene having from 1–20 carbon atoms, preferably from 3–8 carbon atoms, and is illustrated by the ethylene, propylene and butylene radicals as well as by the residue of 1,4-butane diol or 1,6-hexane diol; Q is the residue of an organic diisocyanate; y is at least 1, and R and y are selected to provide a molecular weight for the polycarbonate diol reactant of from 300 to 3000, preferably from 600 to 1500.

It will be appreciated that the above materials provide the diisocyanate polycarbonate polyurethane oligomers identified as Z in the previous formula.

It is desired to point out that the polycarbonate diols, and also polyurethanes made therefrom by reaction with diisocyanates, are themselves known compounds, as illustrated in U.S. Pat. No. 4,264,752.

The reaction of the isocyanate-terminated oligomer with the hydroxy functional ethylenically unsaturated monomer is itself well known. Similarly, the reaction of the isocyanate functionality with the amine and/or hydroxy groups of the polyol or amino alcohol compound involves the conventional reactions which are illustrated in the examples using typical catalysts to aid the urethane-forming reaction. It is particularly desirable to employ a linking compound which carries three isocyanate-reactive groups, and to use it in a proportion such that two of the three groups are consumed by reaction with the available isocyanate functionality. It is especially preferred that one of the three isocyanate-reactive groups be less reactive with isocyanate, so that the unreacted hydroxy groups will be uniformly distributed.

Appropriate magnetizable particles are illustrated in the patent referred to previously and also in the examples herein. These are well known and are the same in this invention as in the art.

The polyethylenically unsaturated compounds which have been described may be the only polymerizable material present in the coating composition, but it is preferred to include at least 5% of low molecular weight polyacrylate containing at least 2 acrylate groups per molecule and having not more than 500 units of molecular weight per acrylate group. These are subject to wide variation. More particularly, all sorts of liquid polyacrylates are available and may be used, such as butylene glycol diacrylate and trimethylol propane triacrylate, but it is preferred to use an organic polyisocyanate whose isocyanate functionality has been consumed by reaction with hydroxyethyl acrylate. Preferred polyisocyanates for this purpose are toluene diisocyanate and isophorone diisocyanate or a trimer thereof produced by forming an isocyanurate ring from three of the isocyanate groups in a reaction known per se. Also tris-hydroxyethyl isocyanurate triacrylate is another useful polyacrylate, albeit it is not a liquid at room temperature.

It is preferred that the polyethylenically unsaturated compound constitute at least about 30% up to about 80% of the total polymerizable material in the coating composition, more preferably at least about 50%. The low molecular weight polyacrylate will desirably be present in an amount of from 5% to about 70% of total polymerizable material, preferably in an amount of at least 10%.

While magnetizable particles and electron beam curing are preferred, one may use pigments to merely provide opacity or coloration, and when the pigmentation is not excessive, one can incorporate photoinitiators, like benzophenone, and sensitizers, like diethyl amine, as is well known, and cure with ultraviolet light. This is not preferred because the pigments absorb ultraviolet light.

In this application, all proportions are by weight, unless otherwise stated, and the invention is illustrated in the examples which follow.

EXAMPLE 1

There were charged to a 250 ml three neck round bottom flask equipped with a thermometer, distilling column, heating mantle, magnetic stirrer, distilling head, air condenser, receiver and vacuum attachments, 45 grams of 1,4-butanediol, 85.6 grams of diphenyl carbonate and 0.1 gram of sodium hydroxide. The flask was evacuated to a pressure of about 10 mm Hg and the mixture was stirred and heated to about 100° C. and kept at these conditions for about three hours during which slow phenol distillation was observed. After three hours the pressure was reduced to 1 mm Hg and the temperature raised to 120° C. for 1 hour to complete the phenol distillation. After 1 hour the residue was cooled to room temperature and acetic acid was added dropwise until the mixture was neutralized. A distillate of 75.5 grams of phenol and a residue of 53.2 grams of a polymeric carbonate diol having a number average molecular weight of 554 was recovered.

The polycarbonate produced above is a linear polymer having one hydroxyl group at each end thereof, so it is a polycarbonate diol.

EXAMPLE 2

1 mole of the polycarbonate diol of Example 1 is reacted with 2 moles of isophorone diisocyanate in the presence of a trace of dibutyl tin dilaurate to provide an isocyanate-terminated polyurethane, and 1 mole of 2-hydroxyethyl acrylate is then added and reacted to end cap one end of the diisocyanate-terminated polymer to provide a product which is largely a monoisocyanate monoacrylate oligomer.

EXAMPLE 3

2 molar proportions of the polymeric monoisocyanate monoacrylate produced in Example 1 (which provides 2 equivalents of isocyanate functionality) is mixed with 1 mole of isophorone diisocyanate and reacted with 2.0 moles of glycerin (which provides 4 equivalents of primary hydroxy functionality). The result is a diacrylate polyurethane oligomer in which the isocyanate functionality is consumed and the secondary hydroxy group in the glycerin is retained.

Example 3 is repeated substituting 2 moles of monoethanol amine reacted with one mole of ethylene dichloride for the 2 moles of glycerin used in Example 3. Corresponding results are obtained except the product includes urea groups in place of urethane groups. In both example 3 and this modification thereof, one can add a solvent, like tetrahydrofuran to provide a liquid of coating viscosity, and this liquid accepts pigment well, the grinding operation to distribute the pigment in the vehicle being significantly eased.

What is claimed is:

1. An electron beam-curable coating composition comprising a liquid composition comprising an hydroxy-functional polyethylenically unsaturated polyurethane having the following structural formula:

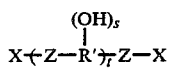

in which X is an ethylenically unsaturated monomer initially carrying a single hydroxy group, R' is the residue of an at least trifunctional polyol or amino alcohol linking compound, s is a number of 0.8 to 10, t is a number from 1 to 15, and Z is a diisocyanate terminated polycarbonate diol polyurethane oligomer having the following structure:

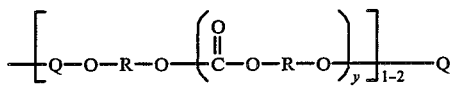

in which R is alkylene having from 1–20 carbon atoms; Q is the residue of an organic diisocyanate; y is at least 1; and R and y are selected to provide a molecular weight for the polycarbonate diol reactant of from 300 to 3000.

2. A coating composition as recited in claim 1 in which X is an hydroxy-functional acrylate.

3. A coating composition as recited in claim 1 in which R' is the residue of glycerin.

4. A coating composition as recited in claim 1 in which R' is the residue of monoethanol amine.

5. A coating composition as recited in claim 1 in which R contains from 3–8 carbon atoms, and R and y are selected to provide a molecular weight for the polycarbonate diol of from 600 to 1500.

6. A coating composition as recited in claim 1 in which said oligomer is a polyurethane.

7. A coating composition as recited in claim 1 in which said oligomer is a polyurea.

8. A coating composition as recited in claim 1 in which the proportion of said polyethylenically unsaturated compound constitutes at least about 30% up to about 80% of the total polymerizable material in said coating composition.

9. A coating composition as recited in claim 8 in which the proportion of said polyethylenically unsaturated compound is at least about 50% of the total polymerizable material in said coating composition.

10. A coating composition as recited in claim 8 in which said composition includes from 5% up to about 70% of total polymerizable material of low molecular weight polyacrylate containing at least 2 acrylate groups per molecule and having not more than 500 units of molecular weight per acrylate group.

11. A coating composition as recited in claim 10 in which said composition includes at least 10% of said polyacrylate.

12. A coating composition as recited in claim 1 in which said composition is pigmented.

13. A coating composition as recited in claim 12 in which said pigment particles are magnetizable particles in an amount of from 50% to 85% by weight based on the total weight of the cured coating, and said composition contains from 25% to 50% of total nonvolatile solids, balance volatile organic solvent.

14. 4 coating composition as recited in claim 1 in which said polyethylenically unsaturated compound is produced by reacting a linear diisocyanate-terminated prepolymer with an ethylenically unsaturated monomer having a single hydroxyl group to provide an oligomeric monoisocyanate which is end capped with an ethylenic group on one of its two ends, said oligomeric monoisocyanate being then reacted with sufficient linking compound to consume the isocyanate functionality in said monoisocyanate by reaction with two of the reactive groups in said linking compound, the remaining hydroxyl groups on the linking compound remaining unreacted.

15. A coating composition as recited in claim 14 in which said monomer is an hydroxyalkyl acrylate.

* * * * *